Jan. 12, 1965 E. H. SMITH ETAL 3,165,061
METHOD AND APPARATUS EMPLOYING ACOUSTIC
ENERGY FOR INCREASING FLUID FLOW
Filed Feb. 18, 1963 2 Sheets-Sheet 1
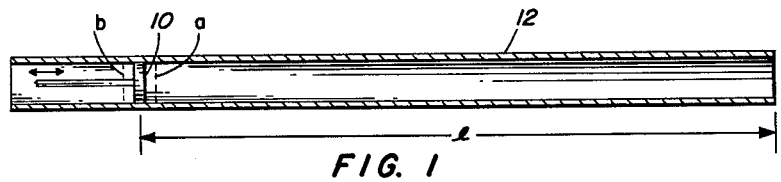
FIG. 1
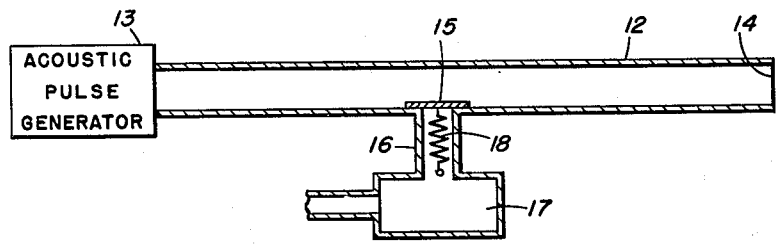
FIG. 2
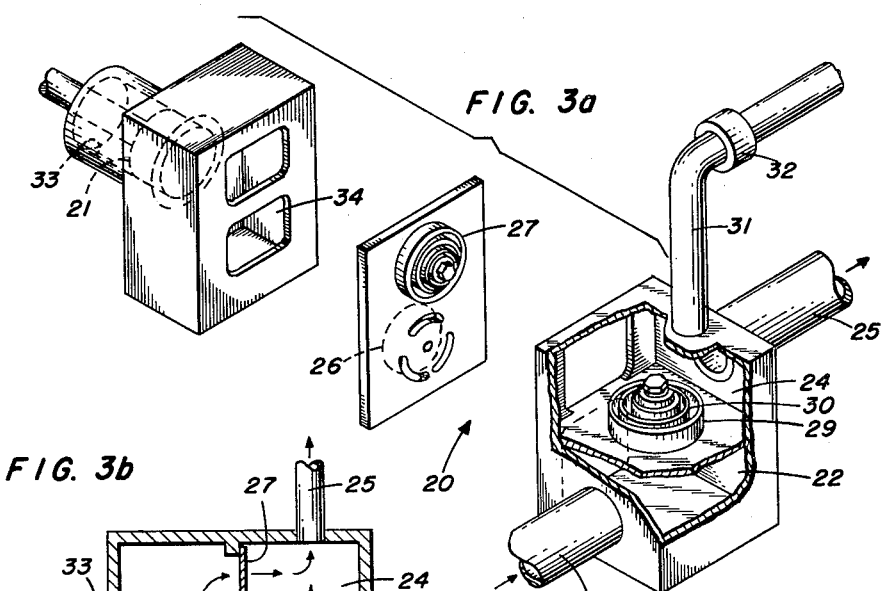
FIG. 3a
FIG. 3b
INVENTORS
EDWARD H. SMITH
DAVID E. STONE
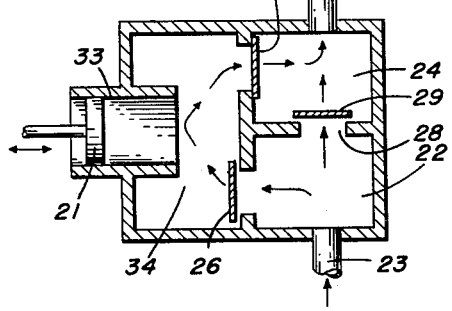
BY Claude Funkhouser
ATTORNEY
Leonard L. Lourie
AGENT

United States Patent Office 3,165,061
Patented Jan. 12, 1965

3,165,061
METHOD AND APPARATUS EMPLOYING ACOUSTIC ENERGY FOR INCREASING FLUID FLOW
Edward H. Smith, Silver Spring, and David E. Stone, Rockville, Md., assignors, by mesne assignments, to the United States of America as represented by the Secretary of the Navy
Filed Feb. 18, 1963, Ser. No. 259,472
1 Claim. (Cl. 103—1)

This invention relates to fluid flow systems, and more particularly, to the use of acoustic energy in such systems to produce beneficial flow conditions.

An object of the invention is to provide unique methods of operating pumps to increase their efficiency beyond their theoretical capabilities.

A further object of the invention is to provide unique apparatus and methods utilizing acoustic energy to increase the fluid flow therethrough.

Other objects, advantages and novel features of the invention will become apparent from the following detailed description of the invention when considered in conjunction with the accompanying drawings wherein:

FIG. 1 is an explanatory diagram illustrating the generation of acoustic impulses in a fluid;

FIG. 2 is a diagrammatic view illustrating the use of acoustic energy to increase flow of fluid through a pipe or conduit;

FIG. 3a is a view illustrating the construction of the single-acting pump;

FIG. 3b is a view illustrating the application of the invention to a reciprocating single-acting pump provided with a bypass in accordance with the invention;

Figure 4A:
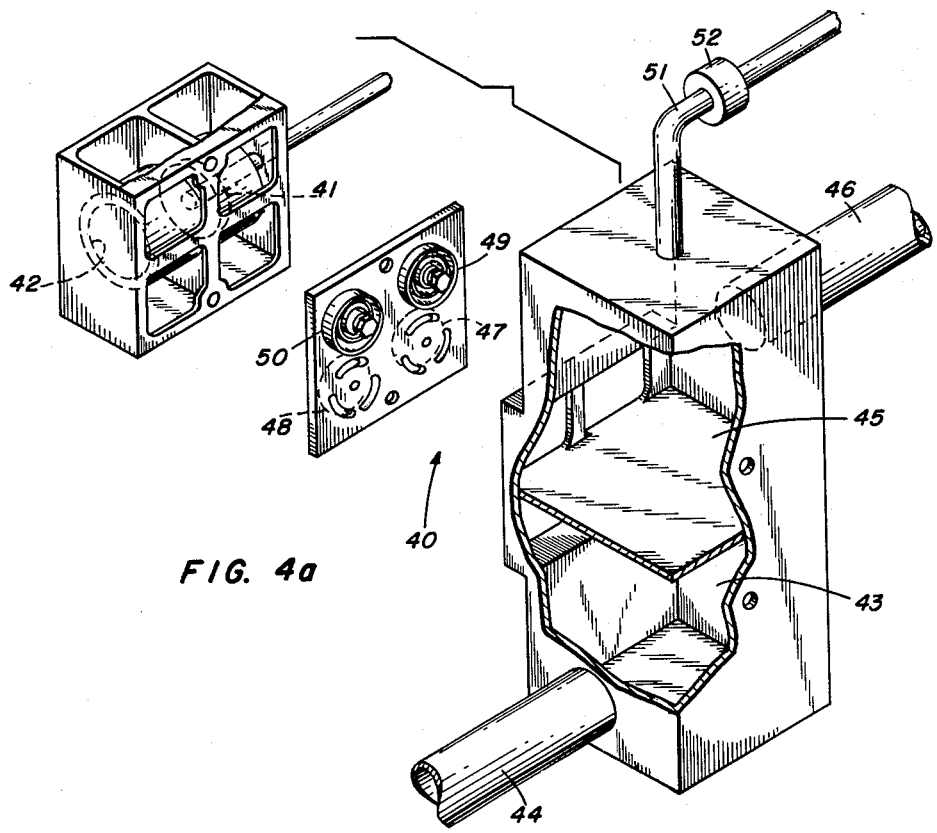
FIG. 4a is a fragmentary, exploded view, partly broken away, illustrating somewhat diagrammatically the construction of a double-acting pump in accordance with the invention.

A broad concept of the invention involves the generation and beneficial use in fluid flow systems of acoustic waves, which may also be termed compressional or shock waves. Such waves may be induced in a stream of fluid in many ways, a simple scheme being illustrated in FIG. 1, in which a plane piston 10 reciprocates in a pipe 12 of length $l$ between the positions A and B indicated by the dotted lines.

Let $d$ be the amplitude of the piston vibration between positions A and B, $\nu$ be the frequency of the piston movement, $c$ be the velocity of sound in the fluid within the pipe, $l$ be the length of the pipe 12, $\omega$ be equal to $2\pi\nu$, $k$ be equal to $$\frac{2\pi\mu}{c}$$

and $\xi_0$ equal to $$\frac{d}{\cos kl}$$

then the particle displacement generated in the resultant acoustic wave will be $\xi = \xi_0 \cos[k(x-l)] \cos \omega t$. The cosine function is used since one of the boundary conditions in the instant application is that the pressure equals zero when $x$ equals $l$. (See Morse P. M., Vibration and Sound, McGraw-Hill, 1936, page 195.)

The associated acoustic pressure $p$ is equal to $$-\rho c^2 \left(\frac{\partial \xi}{\partial x}\right)$$

where $\rho$ = density of the fluid. Substituting $\xi$ in this equation, then $p = -\rho c^2 k \xi_0 \sin[k(x-l)] \cos \omega t$. The maximum acoustic pressure (reaction force per unit area on the piston) is as follows:

$p \max = -\rho c^2 k \xi_0 \sin kl \cos \omega t$ that is when $x=0$. However, the reaction on the piston will vary with length $l$ of the line, being a maximum if $\sin kl = 1$ and a minimum if $\sin kl = 0$.

In the description of the invention, theories of operation and mathematical explanation will be given, but it is to be noted that these theories are advanced to assist in the comprehension of the invention as presently understood and not to restrict the invention to a particular theory or explanation.

FIG. 2 illustrates one manner in which acoustic energy may be utilized in a fluid stream in accordance with the invention. In this embodiment an acoustic pulse generator 13, which may assume many different forms as will become apparent hereinafter, is coupled to a pipe 12 so as to induce positive pressure impulses in a fluid within the pipe. These impulses travel down the pipe at the speed of compressional waves within the particular fluid and are reflected from the open end 14 of the pipe to a degree dependent upon the relationship between the frequency of the pulses and the length of the pipe, as indicated above. In the reflection process, the impulses become negative pressure impulses (that is with the sign reversed). These negative pressure impulses travel in the upstream direction toward the generator 13 where, if they were not absorbed, they would again be reflected, with an accompanying change in sign, and be propagated along the pipe in the downstream direction.

In accordance with the principles of the invention, the negative pressure pulses are absorbed in performing useful work. This may be accomplished, as shown in FIG. 2, by placing a one-way valve 15 in a passage 16, which may be a branch line from a fluid reservoir 17 or an adjacent line carrying fluid. Valve 15 is normally biased to a closed position, as by a suitable return spring 18. Thus, the valve 15 can only be open when the pressure in the pipe 12 at the valve 15 is less than the pressure in the passage 16. This pressure difference has to be sufficient to overcome the biasing of spring 18 so as to promote the flow of fluid from the passage 16 to the pipe 12.

High acoustic pressures can be readily generated in the fluid within the pipe 12, considerably higher than the steady line pressure. It has been found that when acoustic waves are generated in the fluid, as described above, the valve 15 will be opened by the negative pressure impulses, and fluid will be drawn from the passage 16 past the valve 15 into the pipe 12 at a rate determined precisely by the average value of the negative pressure acoustic pulse cycles at the valve. Since energy of the acoustic waves is damped out by the opening of valve 15, the system operates quietly. It is only the negative pressure impulses which can perform the useful work of opening the valve 15. The positive pressure impulses of the generator 13 are not abosrbed by the valve 15 which is normally biased closed but are converted to negative pressure impulses upon reflection. Thus, there is an average negative pressure in the pipe 12 at the valve 15.

In accordance with an embodiment of the invention, acoustic wave energy in a stream of liquid is utilized to increase significantly the efficiency of a single-acting pump. As shown in FIGS. 3a and 3b, the single-acting pump 20 has a reciprocating piston 21, an intake chamber 22 connected to an inlet pipe 23, an outlet chamber 24 connected to an outlet pipe 25 of length $l$, an intake valve 26 and an exhaust valve 27 provided with a bypass passage 28 between the intake exhaust chambers 22 and 24, respectively. The bypass passage is controlled by a one-way valve 29 which can only open to permit flow in the downstream direction and which is normally closed by biasing spring 30. The valves, as indicated, may be of the spring-biased poppet type, which is normally closed and which opens against the spring bias depending on the relative fluid pressures on the opposite sides of the valve.

Conventionally, single-acting pumps, such as that illustrated, must be operated with an air buffer in the dome of the exhaust chamber. The reason for the air buffer is to eliminate the familiar "water hammer" effect. Contrary to conventional practice the present invention insures that the pump does operate in the water hammer mode, and, in fact, utilizes the water hammer effect to produce acoustic impulses which are employed beneficially. To accomplish this as shown in FIG. 3a, an air bleed line 31 is connected to the dome of the exhaust chamber 24 and a valve 32 is placed in the line so that air may be bled from the exhaust chamber by opening the valve 32 as fluid is admitted to the pump, the valve 32 then be closed to prevent re-entry of air into the exhaust chamber.

In the operation of the pump, when the piston 21 moves so as to enlarge the volume of cylinder 33, intake valve 26 opens and exhaust valve 27 closes, and fluid is drawn from intake chamber 22 and pipe 23 into the cylinder chamber 34. When the piston 21 moves in the opposite direction, intake valve 26 then closes and exhaust valve 27 opens to permit the fluid to flow from the cylinder chamber 34 into the exhaust chamber 24 and the outlet pipe 25. The positive acoustic impulses generated by the piston are reflected by outlet end of pipe 25 and create negative pressure impulses traveling back to the valve 29. The negative pressure impulses open the valve 29 causing liquid to flow from the intake chamber 22 to the exhaust chamber 24 through the passage 28, thereby absorbing the acoustic energy and augmenting the fluid flow. By adjustment and control of the size of the bypass passage 28 and the valve 29, the average pressure at the valve 29 can be made substantially equal to the pressure at the outlet of the pipe 25, which may be atmospheric, for example, so that there is no frictional pressure loss between the valve 29 and the outlet of pipe 25.

Figure 4B:
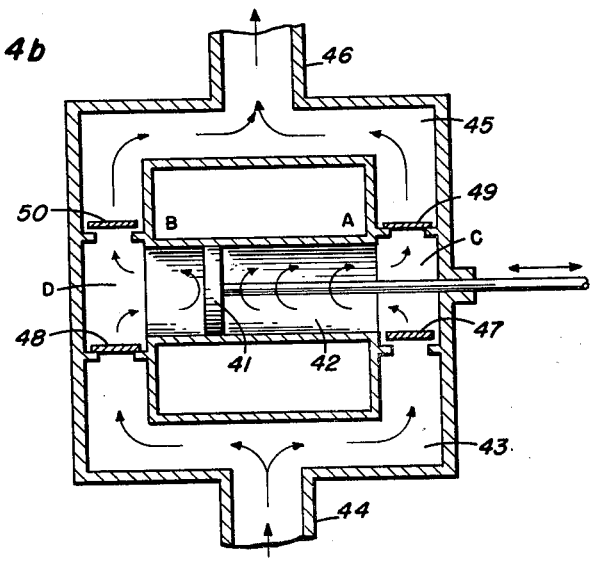
FIG. 4b is an explanatory diagram illustrating the operation of a reciprocating double-acting pump in accordance with the invention.

In accordance with another embodiment of the present invention, acoustic wave energy in a stream of liquid is utilized to increase significantly the efficiency of a reciprocating double-acting pump. It has been found that the pumping rate can be made far greater than the theoretical capacity of such a pump. As shown in FIGS. 4a and 4b, a reciprocating double-acting pump generally designated by reference 40 has a piston 41 which reciprocates within a cylinder 42 between points A and B. The piston divides the cylinder into chambers C and D. The pump has an intake chamber 43 which receives liquid from a pipe 44 and has an exhaust chamber 45 which supplied liquid to a pipe 46. A pair of intake valves 47 and 48 are arranged to connect the intake chamber 43 to chamber C and D, respectively, and a pair of exhaust valves 49 and 50 are arranged to connect the exhaust chamber 45 to the same chambers C and D. As indicated, the valves may be of the spring-biased poppet type.

In FIG. 4a, an air bleed line 51 is connected to the dome of the exhaust chamber 45, and a valve 52 is placed in the line so that air may be bled from the exhaust chamber by opening the valve as fluid is admitted to the pump, the valve then being closed to prevent the re-entry of air into the exhaust chamber to operate the pump in the water hammer mode.

The operation of a double-acting pump in accordance with the invention will now be described. Referring to FIG. 4b, in one cycle of operation of the pump, the piston 41 moves from the position A to the position B and back to the position A. As the piston moves in the direction from right to left, that is from A to B, the chamber C increases in volume, causing the intake valve 47 to open against its spring bias and drawing liquid from the pipe 44 and the intake chamber 43 into the chamber C. Exhaust valve 49 remains closed, because the pressure in chamber 45 is greater than the pressure in chamber C. Since chamber D is decreasing in volume, exhaust valve 50 opens to permit the fluid in chamber D to enter the exhaust chamber 45. Intake valve 48 remains closed because the pressure in the intake chamber 43 is less than in chamber D. When piston 30 moves in the reverse direction from B to A, intake valve 48 opens, exhaust valve 50 closes, exhaust valve 49 opens, and intake valve 47 closes. Now, assuming that the pump is operating in the water hammer mode (air withdrawn from chamber 45), the pump will produce positive pressure pulses in the pipe 46. These pulses will vary as $|\sin \omega t|$. This results in a steady pressure of amplitude $= -\rho c^2 k \xi_0 (2/\pi) \sin kl$. The most important Fourier component of $|\sin \omega t|$ above the steady state is the one of amplitude $-\cos 2\omega t$, and there are, of course, higher harmonics. This, the reaction pressure at the valves 49 and 50 behaves as $$\rho c^2 (2\omega) \xi_0 \sin kl \cos 2\omega t$$

Whenever this pressure is negative, there will be a reduction in pressure in chamber 45 at the exhaust valves 49 and 50. With a reduction in pressure sufficient to overcome the bias of the exhaust valve spring, the closed exhaust valve, such as the valve 49, will open when normally it would be closed. Liquid is drawn through the corresponding open intake valve 47, bypassing the pump cylinder and flowing directly through the now open exhaust valve 49 into the exhaust chamber 45. The energy of the acoustic wave is absorbed in opening the exhaust valve and in the pumping of additional liquid which results in damping of the acoustic wave. On the next half cycle of pump operation, the same phenomenon occurs at the other normally closed exhaust valve. It has been found that thetheortical capacity of the pump can be exceeded by at least 50% by the operation thereof in the water hammer mode. Not only is this true but after a few moments of operation the pump operates quietly indicating that most of the acoustic energy has been converted to useful work.

In addition to the increased pumping efficiency, there is another very important phenomenon which occurs in the flow when the principles of the invention are employed. Considering the embodiment of FIG. 3, for example, the pump emits only positive pressure impulses. These impulses reflect at the pipe outlet to yield negative pressure impulses which travel back to the exhaust valve and are dissipated in the manner just described. If the impulses were not absorbed, as in opening the valves and performing useful pumping, the negative impulses would reflect again at the valve plate and would travel back down the pipe as positive impulses. However, the negative impulses are absorbed in performing useful work, so that in effect substantially all of the positive impulses are filtered from the flow system leaving a net average negative pressure at the valve plate. This means that the static pressure gradient in the pipe is reversed from that of normal flow, that is the pressure now increases from the valve plate to the pipe outlet rather than vice-versa as in the normal case. This means that the wall frictional forces which create fluid drag must also be reversed. In other words, the flow of the laminar sub-layer near the wall of the pipe must be upstream on the time average. Wall drag is thus not only reduced but is actually removed which has been observed experimentally.

What is claimed is:

A fluid system having a source of fluid, an outlet for said fluid, and a positive displacement pump connected therebetween, said pump comprising:
  inlet and outlet chambers;
  means for bleeding air from the outlet chamber;
  a pressure chamber having a reciprocating piston therein, a one way intake valve for admitting fluid from said inlet chamber, and a one way exhaust valve for permitting fluid to flow to said outlet chamber;

an additional one way valve connecting said inlet and outlet chambers so as to permit fluid to flow from said inlet chamber to said outlet chamber thereby bypassing the pump pressure chamber;

said piston initiating positive acoustic impulses in the fluid from the outlet chamber to the outlet of the system, said positive impulses being reflected by the outlet of the system as negative impulses which travel back to said additional one way valve, whereby the fluid which passes through said additional one way valve adds to the conventional and simultaneous flow from the pressure chamber resulting from the displacement of the piston.

References Cited by the Examiner

UNITED STATES PATENTS

| | | | |
|---|---|---|---|
| 1,272,269 | 7/18 | Humpherey | 103—75 |
| 2,065,926 | 12/36 | Parker | 103—75 |
| 2,232,678 | 2/41 | Dickinson | 103—75 |
| 2,312,712 | 3/43 | Hartline | 230—1 |
| 2,428,460 | 10/47 | Inglis | 103—75 |
| 2,560,851 | 7/51 | Dickinson | 103—75 |

LAURENCE V. EFNER, *Primary Examiner.*